United States Patent Office 3,032,581
Patented May 1, 1962

3,032,581
PHENYLALANINE DERIVATIVES
Frederick Leonard, Yonkers, N.Y., assignor to Geigy Chemical Corporation, Greenburgh, N.Y., a corporation of Delaware
No Drawing. Filed July 11, 1960, Ser. No. 41,764
11 Claims. (Cl. 260—471)

This invention relates to novel phenylalanines, derivatives thereof and salts thereof with acids and bases, as well as to processes for their manufacture.

The new class of compounds is represented by the following general formula:

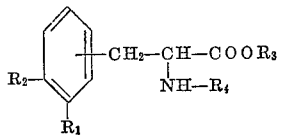

(I)

wherein $R_1$ represents carboxy, lower carbalkoxy and carboxamido, $R_2$ represents halogen, e.g. F, Cl, Br, I, and $CF_3$, $R_3$ represents hydrogen, benzyl and lower alkyl groups, such as e.g. methyl, ethyl, propyl, butyl, amyl and hexyl, $R_4$ represents hydrogen, lower acyl e.g. formyl, acetyl, propionyl, butyryl, pentanoyl, hexanoyl, and benzoyl.

Surprisingly it has now been found that the new compounds are useful medicaments, particularly fast acting analgetic agents of low toxicity, i.e. they can be used for the relief of pain. They may be administered orally or parenterally in the form of the free compounds, their non-toxic acid addition salts with inorganic or organic acids, such as hydrochloric acid, hydrobromic acid, phosphoric acid, acetic acid, oxalic acid, tartaric acid, citric acid etc., or in the form of alkali metal salts of the free carboxylic acid compounds. The new compounds of this invention may be used therapeutically as the racemic mixtures of d- and l-forms which are obtained by synthesis. They may also be resolved into the corresponding optically active modifications which, likewise, may be used in therapy.

The presently preferred compounds are compounds of the formula:

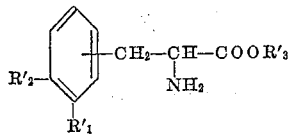

(Ia)

wherein $R'_1$ represents carboxamido, carboxy and lower carbalkoxy e.g. carbomethoxy, carbethoxy, carbopropoxy, carbobutoxy, carbopentoxy, carbohexoxy, $R'_2$ represents halogen, e.g. F, Cl, Br, and I, $R'_3$ represents hydrogen and lower alkyl, e.g. methyl, ethyl, propyl, butyl, pentyl and hexyl, and non-toxic acid addition salts thereof, such as e.g. the hydrochloride thereof.

The members of the new class of compounds of the general Formula I may be obtained in a number of ways.

(A) They may be prepared by hydrolysis and decarboxylation of appropriately substituted acylamidomalonic acid esters of the formula:

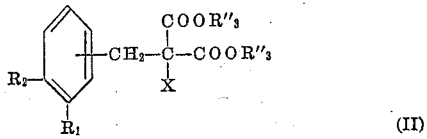

(II)

wherein $R''_3$ represents lower alkyl and benzyl,
X represents an acylamido or acylimido radical, and
$R_1$ and $R_2$ have the meanings given above.

In Formula II $R''_3$ may be represented, e.g. by the ethyl or methyl radical, and X by the formamido, acetamido, benzamido, phthalimido or benzyloxycarbonylamido radical. Decarboxylation can take place when both the ester groups and the amido or imido groups are already hydrolyzed, or after partial hydrolysis of the ester groups only. In this case, compounds of the general Formula I with the free amino group are obtained by further hydrolysis after decarboxylation.

(B) According to the Schmidt reaction, substituted α-benzyl acetoacetic acid esters of the general formula:

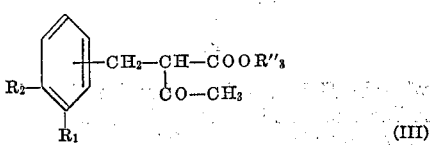

(III)

wherein $R_1$, $R_2$ and $R''_3$ have the meanings given above, are converted by treatment with hydrazoic acid into the substituted α-acetamido-β-phenylpropionic acids or esters which are hydrolyzed to form compounds of the general Formula I with the free amino group in the α-position.

(C) Compounds of the general Formula I may also be obtained by reduction of substituted β-phenylpropionic acid derivatives of the general formula:

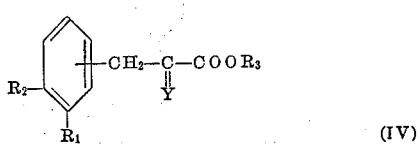

(IV)

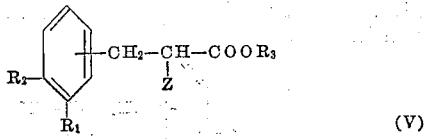

(V)

wherein

Y represents a bivalent nitrogen-containing group which can be converted into the amino group by reduction or reductive cleavage, such as the imino group, oximino group, benzylimino or phenylhydrazono group, Z represents a monovalent nitrogen-containing group which can be converted into the amino group by reduction or reductive cleavage, such as the nitro group, the azido group or the dibenzylamino group, and $R_1$, $R_2$ and $R_3$ have the meanings given above.

(D) Substituted benzylmalonamic esters of the general formula:

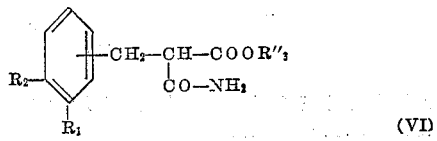

(VI)

wherein $R_1$, $R_2$ and $R''_3$ have the same meanings as previously defined, may be treated with an alkali hypohalite according to Hofmann. With concomitant hydrolysis of the ester group, compounds of the general Formula I are obtained.

Alternatively, substituted benzylcyanoacetic acid hydrazides of the general formula:

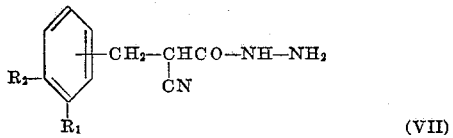

(VII)

wherein $R_1$ and $R_2$ have the meanings given above, may be converted into the corresponding azides with the aid of nitrous acid. According to the Curtius reaction the azides are decomposed by treatment with suitable hydroxy compounds, e.g. ethanol or benzylalcohol, to form the corresponding carbamates, and the latter are hydrolyzed to form compounds of the general Formula I.

(E) Compounds of the general Formula I may further be obtained from substituted α-halo-β-phenylpropionic acids and esters of the general formula:

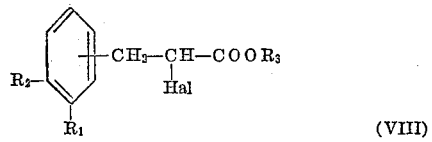

(VIII)

wherein Hal may be a fluorine, bromine, chlorine or iodine atom, and $R_1$, $R_2$ and $R_3$ have the meanings given above, by direct ammoniation, i.e. interaction with ammonia, or by reaction with a salt of a dicarboxylic acid imide or diacylimide, particularly potassium phthalimide, followed by hydrolytic cleavage of the imido moiety, e.g. with sulphuric acid.

(F) Compounds of the general Formula I may also be obtained by treating aldehydes of the general formula:

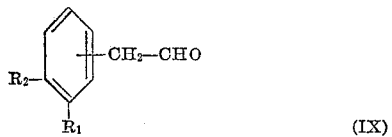

(IX)

wherein $R_1$ and $R_2$ have the same meanings as in Formula I, with a mixture of an alkali metal cyanide and ammonia. Hydrolysis of the intermediate aminonitrile of the general formula:

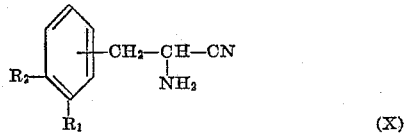

(X)

wherein $R_1$ and $R_2$ have the same meanings as in Formula I yields compounds of general Formula I.

(G) Another method of preparing the compounds of the general Formula I is by reduction followed by hydrolysis, or by reductive cleavage of easily accessible classes of heterocyclic compounds, such as substituted 4-benzylidene hydantoins of the general formula:

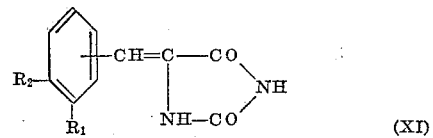

(XI)

substituted 3,6-bis-benzylidene-2,5-diketo-piperazines of the general formula:

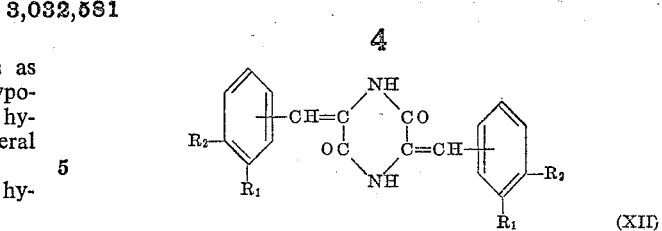

(XII)

and substituted 4-benzylidene-oxazolones of the general formula:

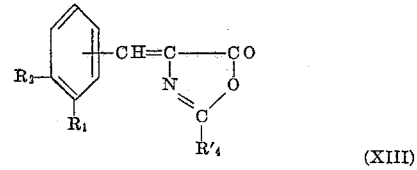

(XIII)

wherein $R_1$ and $R_2$ have the meanings given above, and $R'_4$ represents a lower alkyl group or the phenyl radical.

The reduction to substituted benzyl compounds can be effected, e.g. by means of sodium amalgam and sodium hydroxide solution, or tin and hydrochloric acid; the hydrolysis can be effected, e.g. with hydrochloric acid, and the reductive cleavage is performed by means of hydriodic acid in the presence or absence of red phosphorus. It is, however, also possible to partially hydrolyze oxazolones of the general Formula XII to substituted α-acylamidocinnamic acids of the general formula:

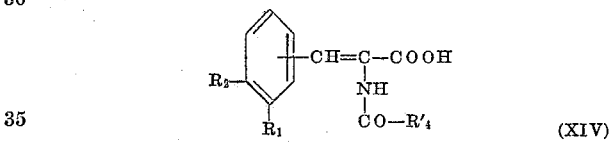

(XIV)

wherein $R_1$, $R_2$ and $R'_4$ have the meanings given above. These cinnamic acid derivatives can be reduced, e.g. by hydrogenation in the presence of a palladium catalyst, to substituted α-acylamido-β-phenylpropionic acids of the general Formula I.

In spite of the fact that the methods for the production of compounds of the general Formula I seem to differ to some extent from each other, the starting materials for these methods can preferably be prepared from a few classes of compounds, of which some representatives are already known. Such compounds chiefly are halomethyl halobenzoic acids and their derivatives, and formyl halobenzoic acids and their derivatives.

Thus, by condensation of halomethyl compounds of the general formula:

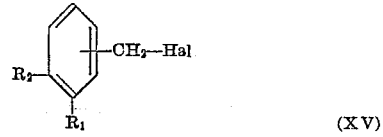

(XV)

wherein $R_1$, $R_2$ and Hal have the meanings given above, with metal compounds of acylamido or acylimido malonic acid esters of the general formula:

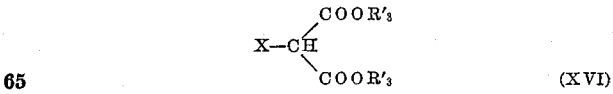

(XVI)

wherein $R'_3$ and X have the meanings given above, starting materials of the general Formula II are obtained. By the analogous condensation of the above mentioned halomethyl compounds with metal compounds of acetoacetic acid esters, the starting compounds of the general Formula III are obtained, which can be submitted directly to the Schmidt reaction or can be converted into starting materials of the general Formula IV, e.g. by reaction with an alkyl nitrite, or with an alkali metal and benzene diazonium chloride. Further, halomethyl compounds of the general Formula XV can be condensed with metal compounds of cyanoacetic acid esters, and the substituted benzylcyanoacetic acid esters so obtained can be partially hydrolyzed to form substituted benzylmalonamic acid esters of the general Formula VI, or the benzylcyanoacetic acid esters can be converted by reaction with hydrazine into substituted benzylcyanoacetic acid hydrazides of the general Formula VII. The previously named condensation products of the halomethyl compounds with acetoactic acid esters or cyanoacetic acid esters or analogous condensation products with malonic acid esters can be converted into α-halo-β-phenylpropionic acids and their esters of the general Formula VIII by halogenation, hydrolysis, subsequent or concomitant decarboxylation and, if desired, esterification. These acids and esters are also useful for the preparation of starting materials of the general Formula V, e.g. by reaction with sodium or potassium nitrite or azide. Finally, the above mentioned halomethyl compounds can be reacted with alkali metal cyanides, and the latter can be converted into substituted phenylacetaldehydes of the general Formula IX, e.g. by reduction with stannous chloride and hydrogen chloride according to Stephen.

On the other hand, formyl halobenzoic acids and their derivatives of the general formula:

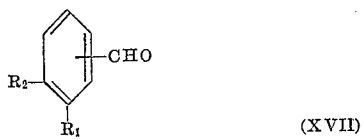

(XVII)

wherein $R_1$ and $R_2$ have the meanings given above, can be condensed with hydantoin or thiohydantoin to form substituted 4-benzylidene hydantoins of the general Formula XI, or substituted 4-benzylidene thiohydantoins. The latter can be converted into the corresponding hydantoins, e.g. by treatment with aqueous chloroacetic acid. Further, the formyl compounds of the general Formula XVII can be condensed with 2,5-diketo-piperazine (glycine anhydride) or acetylglycine anhydride in the presence of acetanhydride and sodium acetate to form substituted 3,6-bis-benzylidene-2,5-diketopiperazines of the general Formula XII. When acylglycines, such as acetylglycine or hippuric acid are condensed with formyl compounds of the general Formula XVII, substituted 4-benzylidene oxazolones of the general Formula XIII are obtained, which can be used as indicated above or which can be hydrolyzed with non-reducing acids, e.g. hydrochloric acid to form substituted phenylpyruvic acids which, in their turn, can be converted into starting materials of the general Formula IV, e.g. by treatment with ammonia, hydroxylamine or benzylamine.

By reacting formyl compounds of the general Formula XVII with nitroacetic acid esters, substituted α-nitro-β-hydroxy-β-phenylpropionic acid esters are obtained which can be dehydrated to form substituted α-nitro-cinnamic acid esters. These are reduced to substituted α-nitro-β-phenylpropionic acid esters, which are among the starting materials of general Formula V. Finally, as a possibility of producing starting materials of the general Formulas VI and VII from formyl compounds of the general Formula XVII, the condensation of the latter with cyanoacetic acid esters followed by reduction of the substituted benzylidene cyanoacetic acid esters to form substituted benzylcyanoacetic acid esters which can be converted further as indicated above, may be mentioned.

It is clear, in view of the reaction conditions of some of the methods for the preparation of compounds of the general Formula I, that original ester groups $R_2$, N-acyl groups $R_4$ and, occasionally, carboxamido groups $R_2$ cannot or can only with difficulty be retained during the reactions. Therefore, it is in many cases more advisable to prepare esters, and N-acyl compounds of the general Formula I by esterification of free carboxylic acids or by acylation of compounds with a free amino group. Also compounds with an N-acyl group left unchanged during their preparation can be converted by hydrolysis into other compounds of the general Formula I.

The preparation of the compounds of the present invention is more fully described in the following examples. It is to be understood that the examples are illustrative of the methods employed and are not to be construed as limiting the invention to the particular reactions which are specifically described.

The temperatures are given in degrees centigrade and the parts are by weight unless otherwise noted. The relationship of parts by weight to parts by volume is as that of grams to cubic centimeters.

EXAMPLE 1

*Preparation of 3-Carboxy-4-Chlorophenylalanine Hydrochloride*

(a) *2-chloro-5-methylbenzoic acid.*—To a cold solution of 184 parts NaOH in 300 parts by volume of water is added 1200 parts of ice. 360 parts of bromine are dropped into this solution slowly with stirring. Then 84.3 parts of 2-chloro-5-methylacetophenone (0.5 mole) are added and the mixture is heated, with vigorous stirring, to 55°. At this temperature, heating is stopped. The solution is heated itself to 68° by the heat of reaction, thereafter the temperature being kept between 65° and 68° by intermittent cooling and heating, for 25 hours, after which a solution of 100 parts of sodium metabisulfite in 100 parts by volume of water is added. After cooling to 15°, the acid is precipitated slowly while stirring with 300 parts by volume of concentrated HCl, filtered, washed with ice water and dried in vacuo at 100°. The dried 2-chloro-5-methylbenzoic acid is recrystallized from benzene, yielding 74.8 parts (87.5%) whose melting point is 153–155°.

(b) *Methyl 2-chloro-5-methylbenzoate.*—A mixture of 42.6 parts of 2-chloro-5-methylbenzoic acid, 75 parts by volume of 1,2-dichloroethane, 31 parts by volume of methanol and 4 parts by volume of concentrated $H_2SO_4$ is refluxed for 20 hours. The resultant aqueous layer is separated, the organic layer being washed with water, bicarbonate solution, and again with water. After drying the organic layer with $MgSO_4$ and filtration, to remove the $MgSO_4$, the solvent is evaporated from the organic layer and the residue is distilled under vacuum, yielding 38.7 parts (84%) of methyl 2-chloro-5-methylbenzoate having a boiling point of 79–80° at 0.85 mm. Hg and whose refractive index at 22° (sodium D line) is 1.5338.

| Analysis | C, percent | H, percent |
|---|---|---|
| Calculated for $C_9H_9ClO_2$ | 58.55 | 4.91 |
| Found | 58.20 | 4.89 |

(c) *Methyl -2-chloro-5-bromomethylbenzoate.*—A mixture of 17.8 parts of N-bromosuccinimide, 120 parts by volume of dry carbon tetrachloride, 18.5 parts of methyl-2-chloro-5-methylbenzoate and 4.85 parts of benzoyl peroxide are refluxed for 4 hours. After cooling at ice-box temperature overnight, the succinimide is removed from the reaction mixture by filtration and the filtrate is washed with bisulfite solution. The filtrate is dried with magnesium sulfate and the magnesium sulfate removed by filtration, after which the solvent is distilled off and the residue dissolved in 50 parts by volume of benzene. The resultant solution is passed through an aluminum oxide column to remove benzoyl peroxide. The benzene is removed from the peroxide free solution by evaporation and application of high vacuum. The yield of methyl 2-chloro-5-bromoethylbenzoate is 20 parts (75%).

| Analysis | C, percent | H, percent | Br, percent |
|---|---|---|---|
| Calculated for $C_9H_8BrClO_2$ | 41.02 | 3.06 | 30.33 |
| Found | 42.98 | 3.75 | 26.83 |

(d) *Diethyl acetamido-(3-carbomethoxy-4-chlorobenzyl) malonate.*—To a solution of 1.7 parts sodium in 100 parts by volume of absolute alcohol, 15.7 parts of diethyl acetamidomalonate and 18.7 parts of methyl 2-chloro-5-bromomethylbenzoate are added. The resultant mixture is refluxed with stirring for 5 hours. The sodium bromide formed is filtered off after cooling, the solvent being evaporated. The solid residue is recrystallized from benzene/n-hexane, then from cyclohexane and finally from isopropanol to yield 12.5 parts (44%) of diethyl acetamido-(3-carbomethoxy - 4 - chlorobenzyl)-malonate which melts at 112–114°.

| Analysis | C, percent | H, percent | N, percent |
|---|---|---|---|
| Calculated for $C_{18}H_{22}ClNO_7$ | 54.07 | 5.55 | 3.50 |
| Found | 54.43 | 6.03 | 3.18 |

(e) *4-chloro-3-carboxyphenylalanine hydrochloride.*—8.0 parts of diethyl acetamido-(3-carbomethoxy-4-chlorobenzyl) malonate are refluxed with 50 parts by volume of 6 N HCl for 16 hours. After cooling the reaction mixture, the precipitate is removed therefrom by filtration and recrystallized from isopropanol, after which the product is dried in a vacuum-oven at 100°. The so-obtained 3-carboxy-4-chlorophenylalanine hydrochloride weighs 2.7 parts (48%) and melts at 255° with decomposition.

| Analysis | C, percent | H, percent | N, percent |
|---|---|---|---|
| Calculated for $C_{10}H_{10}ClNO_4 \cdot HCl$ | 42.88 | 3.96 | 5.00 |
| Found | 42.62 | 3.99 | 4.97 |

EXAMPLE 2

*Preparation of 3-Carboxamido-4-Chlorophenylalanine*

(a) *2-chloro-5-bromomethylbenzoic acid.*—A mixture of 17.6 parts (0.1 mole) of 2-chloro-5-methylbenzoic acid [Example 1(a)], 250 parts by volume of carbon tetrachloride, 17.8 parts (0.1 mole) of N-bromosuccinimide and 4 parts of benzoyl peroxide is refluxed for one hour. Succinimide is removed by filtration from the reaction mixture and the filtrate is concentrated to a syrupy residue. The syrup is dissolved in benzene and chromatographed on an alumina column. The column is eluted with benzene. The eluate is evaporated in vacuo and the residual syrup is crystallized on trituration with petroleum ether (B.P. 50–60°) to yield 10 parts (40%) of 2-chloro-5-bromomethylbenzoic acid which melts at 40–42°.

| Analysis | C, percent | H, percent |
|---|---|---|
| Calculated for $C_8H_6BrClO_2$ | 38.49 | 2.57 |
| Found | 40.07 | 2.40 |

(b) *Diethyl formamido-(3 - carboxy - 4 - chlorobenzyl) malonate.*—A solution of 20.4 parts (0.3 mole of sodium ethylate in absolute alcohol is prepared by dissolving 6.9 parts (0.3 mole) of sodium in 200 parts by volume of alcohol. The solution is cooled at 60° and 30.4 parts (0.15 mole) of diethyl formamidomalonate dissolved in 100 parts by volume of toluene is added. The mixture is stirred for 30 minutes at a temperature of 60° and then a solution of 38.0 parts (0.152 mole) of 5-bromomethyl-2-chlorobenzoic acid dissolved in 100 parts by volume of benzene is added all at once. The mixture is stirred and refluxed for 8 hours, then cooled and let stand overnight at room temperature. The solvents are removed from the mixture in vacuo, whereupon 250 parts by volume of water is added to the residue. Water is decanted from the resultant oily layer and the remaining heavy syrup is dissolved in saturated sodium bicarbonate solution. The resultant bicarbonate solution is extracted with benzene and acidified to Congo red with dilute (3 N) hydrochloric acid. The precipitate of diethyl formamido-(3-carboxy-4-chlorobenzyl)malonate is filtered off and recrystallized from 95% alcohol, having a melting point of 165–166°. The yield of product is 12.5 parts (22%).

| Analysis | C, percent | H, percent | N, percent |
|---|---|---|---|
| Calculated for $C_{16}H_{18}ClNO_7$ | 51.61 | 4.83 | 3.76 |
| Found | 51.48 | 4.77 | 3.66 |

(c) *Diethyl formamido-(3 - carboxamido-4-chlorobenzyl)malonate.*—Diethyl formamido(3 - carboxy-4-chlorobenzyl)malonate (12.5 parts, 0.03 mole) is dissolved in 300 parts by volume of benzene. To the resulting solution 4 parts (10% excess) of thionyl chloride is added. The reaction mixture is then refluxed for 10 hours and concentrated in vacuo to remove excess thionyl chloride. The residue is taken up in benzene and the resulting solution saturated with gaseous ammonia. Diethyl formamido-(3-carboxamido-4-chlorobenzyl) malonate crystallizes and then the reaction mixture is filtered. The filter cake is washed with water and recrystallized from 95% ethanol. The so obtained diethyl formamido(3-carboxamido-4-chlorobenzyl) malonate melts at 148–149°. The yield is 9.5 parts.

| Analysis | C, percent | H, percent | N, percent |
|---|---|---|---|
| Calculated for $C_{16}H_{19}ClN_2O_6$ | 51.55 | 5.22 | 7.54 |
| Found | 51.20 | 5.63 | 7.48 |

(d) *Formamido - (3-carboxamido-4-chlorobenzyl)-malonic acid.*—14 parts (0.0377 mole) of diethyl-formamido-(3-carboxamido-4-chlorobenzyl) malonate [prepared as in 2(c) above] is mixed with 32 parts by volume of 2.5 N sodium hydroxide solution. This mixture is warmed for 8 minutes on the steam bath, cooled in an ice bath and acidified to Congo red with hydrochloric acid. The resultant precipitate of formamido-(3-carboxamido-4-chlorobenzyl)-malonic acid is removed by filtration and recrystallized from a 9:1 water:alcohol mixture to yield 7 parts of product melting at 175–176°.

| Analysis | C, percent | H, percent | N, percent |
|---|---|---|---|
| Calculated for $C_{12}H_{11}ClN_2O_6$ | 45.77 | 3.18 | 8.96 |
| Found | 45.83 | 3.33 | 8.79 |

(e) *3-carboxamido - 4 - chlorophenylalanine.*—7 parts (0.022 mole) of formamido-(3-carboxamido-4-chlorobenzyl)-malonic acid is refluxed in a mixture of 150 parts by volume of 50% alcohol for 26 hours. The reaction mixture is then concentrated and the residue is recrystallized from water. The 3-carboxamido-4-chlorophenylalanine thus obtained melts at 269–270° and gives a positive test with ninhydrin. The yield is 3.5 parts (65%).

| Analysis | C, percent | H, percent | N, percent |
|---|---|---|---|
| Calculated for $C_{10}H_{11}ClN_2O_3$ | 49.44 | 4.57 | 11.53 |
| Found | 49.14 | 4.59 | 11.20 |

EXAMPLE 3

Preparation of 3-Carboxy-4-Fluorophenylalanine Hydrochloride (a) *2-fluoro-5-methylacetophenone.*—A mixture of 225 parts (2.0 moles) of p-fluorotoluene, 300 parts (2 moles) of aluminum chloride and 300 parts by volume of dry carbon disulfide is stirred and warmed to reflux. To this mixture is added 210 parts (2.8 moles) of acetyl chloride during 1.5 hours at such a rate that reflux continued without external heating. The reaction mixture is then warmed for 3 hours after all of the reagent has been added and is left to stand over night, after which the reaction mixture is poured onto a mixture of 2000 parts of ice and 300 parts by volume of concentrated hydrochloric acid, whereupon the liberated oil is extracted with ether. The ether layer is separated, the ethereal extract dried over anhydrous magnesium sulfate, and the ether is then evaporated in vacuo, the residual oil being distilled at 69–70° at 1.2 mm. Hg. The yield of 2-fluoro-5-methylacetophenone is 225 parts (74%).

| Analysis | C, percent | H, percent |
|---|---|---|
| Calculated for $C_9H_9FO$ | 71.05 | 5.91 |
| Found | 68.50 | 5.74 |

(b) *2-fluoro-5-methylbenzoic acid.*—Bromine (360 parts, 4.5 moles) is added dropwise to a mixture of 184 parts (4.6 moles) of sodium hydroxide, 300 parts by volume of water and 1200 parts of cracked ice. 76 parts (0.5 mole) of 6-fluoro-2-methylacetophenone is added at once to the resulting hypobromite solution. This mixture is then warmed at 90° for 8 hours and the preparation is carried out in the same way as for 2-chloro-5-methylbenzoic acid [Example 1(a)]. 2-fluoro-5-methylbenzoic acid is obtained in 82% yield (65 parts) after recrystallization from a water-alcohol mixture and melts at 146–147° C.

| Analysis | C, percent | H, percent |
|---|---|---|
| Calculated for $C_8H_7FO_2$ | 62.33 | 4.54 |
| Found | 61.91 | 4.49 |

(c) *Methyl 2-fluoro-5-methylbenzoate.*—30.8 parts (0.2 mole) of 2-fluoro-5-methylbenzoic acid are esterified by the method described in Example 1(b). Methyl 2-fluoro-5-methylbenzoate thus obtained distills at 95° and 3.5 mm. Hg. The yield is 28 parts (85%).

| Analysis | C, percent | H, percent |
|---|---|---|
| Calculated for $C_9H_9FO_2$ | 64.28 | 5.36 |
| Found | 64.31 | 5.41 |

(d) *Methyl 2-fluoro-5-bromomethylbenzoate.*—A mixture of 25.2 parts (0.15 mole) of methyl 2-fluoro-5-methylbenzoate, 26.7 parts (0.15 mole) of N-bromosuccinimide, 6 parts of benzoyl peroxide and 400 parts by volume of carbon tetrachloride is stirred and refluxed for 8 hours. Thereafter, the product is worked up in the same way as methyl 2-chloro-5-bromomethylbenzoate [Example 1(c)]. The methyl 2-fluoro-5-bromomethylbenzoate thus obtained after chromatography on alumina weighs 37 parts.

| Analysis | C, percent | H, percent |
|---|---|---|
| Calculated for $C_9H_8BrFO_2$ | 43.70 | 3.25 |
| Found | 44.86 | 3.56 |

(e) *Diethyl acetamido-(3-carbomethoxy-4-fluorobenzyl)-malonate.*—Alkylation of diethyl acetamidomalonate (33 parts, 0.15 mole) with methyl 2-fluoro-5-bromomethylbenzoate (37 parts, 0.15 mole) is carried out in the same manner as described hereinabove [Example 1(d)]. The reaction mixture is refluxed for 8 hours and after purification yields 16 parts (33%) of diethyl acetamido-(3-carbomethoxy-4-fluorobenzyl) malonate which melts at 115–116°, purification being effected by recrystallization from benzene.

| Analysis | C, percent | H, percent | N, percent |
|---|---|---|---|
| Calculated for $C_8H_{22}FNO_7$ | 56.36 | 5.74 | 3.65 |
| Found | 56.78 | 5.87 | 3.47 |

(f) *3-carboxy-4-fluorophenylalanine hydrochloride.*—16 parts (0.042 mole) of diethyl acetamido-(3-carbomethoxy-4-fluorobenzyl) malonate is refluxed for 18 hours in 300 parts by volume of 4 N hydrochloric acid. The reaction mixture is concentrated and the residue is recrystallized from a mixture of isopropanol and ethanol. The yield of 3-carboxy-4-fluorophenylalanine hydrochloride is 8 parts (73%) and melts at 268–269°.

| Analysis | C, percent | H, percent | N, percent | Cl, percent |
|---|---|---|---|---|
| Calculated for $C_{10}H_{10}FNO_4 \cdot HCl$ | 45.54 | 4.21 | 5.31 | 13.45 |
| Found | 45.18 | 4.49 | 5.01 | 13.32 |

EXAMPLE 4

Preparation of 3-Carboxy-4-Bromophenylalanine (a) *2-bromo-5-methylbenzoate.*—2-bromo-5-methylacetophenone is prepared from p-bromotoluene and acetyl chloride in the same manner as 2-fluoro-5-methylacetophenone described hereinabove [Example 3(a)]. Thereafter, 85.2 parts (0.4 mole) of 2-bromo-5-methylacetophenone is stirred and refluxed for 48 hours with 1000 parts by volume of 14% commercial sodium hypochlorite. The reaction mixture is worked up in a manner analogous to that described hereinabove [Example 1(a)]. The yield of 2-bromo-5-methylbenzoic acid is 65 parts (76%). The product melts at 134–135° after recrystallization from benzene.

(b) *Methyl 2-bromo-5-methylbenzoate.*—2-bromo-5-methylbenzoic acid (21.5 g., 0.1 mole) obtained as in Example 4(a) is converted to its methyl ester by a method analogous to that described in Example 1(b). After 96 hours of reflux methyl 2-bromo-5-methylbenzoate is obtained which boils at 115–116° and 2.5 mm. Hg. The yield of product is 15 parts (58%).

| Analysis | C, percent | H, percent |
|---|---|---|
| Calculated for $C_9H_9BrO_2$ | 47.11 | 3.87 |
| Found | 47.44 | 4.04 |

(c) *Methyl 2-bromo-5-bromomethylbenzoate.*—Methyl 2-bromo-5-methylbenzoate (46 parts, 0.2 mole) is brominated with N-bromosuccinimide in a manner analogous to that described in Example 1(c). The reaction mixture is stirred and refluxed for 8 hours, after which the product, methyl 2-bromo-5-bromomethylbenzoate is obtained as a yellow oil after purification by chromatography on alumina in yield of 31 parts (50%).

| Analysis | C, percent | H, percent |
|---|---|---|
| Calculated for $C_9H_8Br_2O_2$ | 35.06 | 2.62 |
| Found | 35.36 | 2.37 |

(d) *Diethyl acetamido - (3 - carbomethoxy - 4 - bromobenzyl)-malonate.*—Diethyl acetamidomalonate (10.8 parts, 0.05 mole) is alkylated in a manner analogous to the alkylation described in Example 1(d). 15.5 parts (0.05 mole) of methyl 2-bromo-5-bromomethylmalonate are refluxed therewith for a period of 9 hours to yield 6.7 parts (30%) of diethyl acetamido-(3-carbomethoxy-4-bromobenzyl) malonate whose melting point is 148–150° after recrystallization from a mixture of alcohol and ether.

| Analysis | C, percent | H, percent | N, percent |
|---|---|---|---|
| Calculated for $C_{18}H_{22}BrNO_7$ | 48.65 | 4.99 | 3.15 |
| Found | 48.03 | 4.86 | 3.47 |

(e) *3 - carboxy-4-bromophenylalanine.*—Diethyl acetamido-(3-carboxy-4-bromobenzyl) malonate (6.5 parts, 0.0146 mole) is refluxed for 24 hours with 25 parts by volume of 6 N hydrochloric acid. The reaction mixture is concentrated to dryness in vacuo and the residue therefrom is digested with 50 parts by volume of 2.8% ammonium hydroxide solution on a steam bath for 15 minutes. The resultant mixture is filtered and the filtrate is concentrated to dryness. The crystalline residue is recrystallized from a 3:1 water-alcohol mixture to yield 4.0 parts (95%) of 3-carboxy-4-bromophenylalanine melting at 222–223°.

| Analysis | C, percent | H, percent | N, percent |
|---|---|---|---|
| Calculated for $C_{10}H_{10}BrNO_4$ | 41.70 | 3.47 | 4.81 |
| Found | 42.10 | 3.79 | 4.44 |

EXAMPLE 5

*Preparation of Ethyl 2-Amino-3-(3-carbethoxy-4-chlorophenyl) Propionate Hydrochloride*

3 parts of 3-carboxy-4-chlorophenylalanine hydrochloride are dissolved in 100 parts by volume of absolute ethyl alcohol and the solution is saturated in a pressure bottle with hydrogen chloride gas. After three days at room temperature the reaction mixture is concentrated in vacuo. The resultant crystalline residue of ethyl 2-amino-3-(3-carbethoxy-4-chlorophenyl)-propionate hydrochloride is recrystallized from a mixture of ethyl alcohol and ether. The yield is 2 parts and the melting point is 173–174°.

| Analysis | C, percent | H, percent | N, percent |
|---|---|---|---|
| Calculated for $C_{14}H_{18}ClNO_4 \cdot HCl$ | 50.00 | 5.69 | 4.16 |
| Found | 49.88 | 5.82 | 4.28 |

If in Example 5, 100 parts by volume of absolute methanol is substituted for the 100 parts by volume of absolute ethyl alcohol, then methyl 2-amino-3-(3-carbomethoxy-4-chlorophenyl)-propionate hydrochloride is obtained.

Further, if 100 parts by volume of dry n-hexanol are reacted with 3-carboxy-4-chlorophenylalanine hydrochloride in a manner similar to the conditions of Example 5, then hexyl 2-amino-3-(3-carbohexoxy-4-chlorophenyl)-propionate hydrochloride is obtained.

What is claimed is:

1. A member selected from the group consisting of (1) a compound of the formula

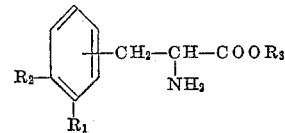

wherein $R_1$ is a member selected from the group consisting of carboxamido, carboxy and lower carbalkoxy, $R_2$ is a member selected from the group consisting of fluorine, chlorine, bromine and iodine. $R_3$ is a member selected from the group consisting of hydrogen and lower alkyl, and (2) the pharmaceutically acceptable non-toxic acid addition salts of (1).

2. 3-carboxy-4-chlorophenylalanine hydrochloride.
3. 3-carboxamido-4-chlorophenylalanine.
4. 3-carboxy-4-fluorophenylalanine hydrochloride.
5. 3-carboxy-4-bromophenylalanine.
6. Ethyl 2-amino-3-(3-carbethoxy-4-chlorophenyl)-propionate hydrochloride.
7. 3-carboxy-4-chlorophenylalanine.
8. 3 - carboxamido - 4 - chlorophenylalanine hydrochloride.
9. 3-carboxy-4-fluorophenylalanine.
10. 3-carboxy-4-bromophenylalanine hydrochloride.
11. Ethyl 2 - amino - 3 - (3 - carbethoxy - 4 - chlorophenyl)propionate.

References Cited in the file of this patent

Hashimoto et al.: Chem Abst., vol. 49, page 15,912 (1955).